United States Patent
Jalluri et al.

(10) Patent No.: US 7,409,261 B2
(45) Date of Patent: Aug. 5, 2008

(54) DATA MANAGEMENT AND NETWORKING SYSTEM AND METHOD

(75) Inventors: Chandra Jalluri, Canton, MI (US); Prashanth Magadi, Canton, MI (US); Moe Lefrancois, Tecumseh (CA)

(73) Assignee: Ford Motor Company, Dearborn, MI (US)

( * ) Notice: Subject to any disclaimer, the term of this patent is extended or adjusted under 35 U.S.C. 154(b) by 361 days.

(21) Appl. No.: 10/904,119

(22) Filed: Oct. 25, 2004

(65) Prior Publication Data

US 2006/0089743 A1   Apr. 27, 2006

(51) Int. Cl.
G06F 19/00 (2006.01)
G05B 19/18 (2006.01)
G21C 17/00 (2006.01)

(52) U.S. Cl. .......................... 700/174; 700/2; 702/182; 702/188

(58) Field of Classification Search .................. 700/2, 700/9, 32, 33, 108–111, 169, 171, 173–177, 700/195, 280, 201–205, 95; 702/182–185, 702/56, 188
See application file for complete search history.

(56) References Cited

U.S. PATENT DOCUMENTS

| | | |
|---|---|---|
| 4,723,219 A | 2/1988 | Beyer et al. |
| 4,816,731 A | 3/1989 | Boulton et al. |
| 4,985,857 A | 1/1991 | Bajpai et al. |
| 5,119,318 A | 6/1992 | Paradies et al. |
| 5,127,005 A | 6/1992 | Oda et al. |
| 5,181,898 A | 1/1993 | Piotrowski |
| 5,339,257 A | 8/1994 | Layden et al. |
| 5,407,265 A | 4/1995 | Hamidieh et al. |
| 5,663,894 A | 9/1997 | Seth et al. |
| 5,672,230 A | 9/1997 | Park et al. |
| 5,719,479 A | 2/1998 | Kato et al. |
| 5,857,166 A * | 1/1999 | Kim ............................ 702/179 |
| 5,896,292 A | 4/1999 | Hosaka et al. |
| 5,937,405 A | 8/1999 | Campbell |
| 6,161,051 A | 12/2000 | Hafemann et al. |
| 6,217,496 B1 | 4/2001 | Lindem |
| 6,240,451 B1 | 5/2001 | Campbell et al. |
| 6,289,735 B1 | 9/2001 | Dister et al. |
| 6,324,659 B1 | 11/2001 | Pierro |
| 6,338,003 B1 * | 1/2002 | Kamiguchi et al. ......... 700/169 |
| 6,442,444 B2 | 8/2002 | Matsubara et al. |
| 6,470,377 B1 | 10/2002 | Sevcik et al. |
| 6,484,109 B1 | 11/2002 | Lofall |
| 6,496,789 B2 | 12/2002 | Seth et al. |

(Continued)

*Primary Examiner*—Sean Shechtman
(74) *Attorney, Agent, or Firm*—Raymond Coppiellie; Brooks Kushman P.C.

(57) ABSTRACT

A data management and networking system and method are provided for automatically retrieving and storing data from a machine tool for distribution to a remote terminal over a network. Raw data related to a machine operation parameter, such as vibrations, are collected. This data is associated with machining operation data, such as the particular cutting tool being used, or the particular feature being cut by the cutting tool. An algorithm is applied to the raw data to generate a parametric representation of the data, thereby significantly reducing the size of the data. At least some data related to non-machining time is separated out, further reducing the size of the data. The associated data is sent to a network server for storage, where it may be accessed by one or more remote terminals.

18 Claims, 5 Drawing Sheets

U.S. PATENT DOCUMENTS

| | | |
|---|---|---|
| 6,587,744 B1 | 7/2003 | Stoddard et al. |
| 6,615,103 B2 | 9/2003 | Fujishima et al. |
| 6,643,592 B1 | 11/2003 | Loman et al. |
| 6,697,894 B1 | 2/2004 | Mitchell et al. |
| 6,731,995 B2 | 5/2004 | Takeuchi |
| 6,738,748 B2 | 5/2004 | Wetzer |
| 6,741,265 B2 | 5/2004 | Ghosh et al. |
| 6,882,961 B2 | 4/2005 | Cobble et al. |
| 6,909,990 B2 | 6/2005 | Okazaki et al. |
| 6,947,797 B2 | 9/2005 | Dean et al. |
| 6,954,680 B2 | 10/2005 | Kreidler et al. |
| 7,054,761 B2 | 5/2006 | Lindberg et al. |
| 7,168,351 B2 | 1/2007 | Hirayama et al. |
| 7,200,774 B2 | 4/2007 | Vollmar et al. |
| 2001/0049325 A1 | 12/2001 | Katoh et al. |
| 2002/0010991 A1 | 1/2002 | Muscarella et al. |
| 2002/0017139 A1 | 2/2002 | Kluft et al. |
| 2002/0129653 A1 | 9/2002 | Seth et al. |
| 2002/0138171 A1 | 9/2002 | Fukutani |
| 2002/0198686 A1* | 12/2002 | Hu et al. .................... 702/188 |
| 2003/0046436 A1 | 3/2003 | Govindaraj et al. |
| 2003/0103827 A1 | 6/2003 | Moller et al. |
| 2003/0212766 A1 | 11/2003 | Giles et al. |
| 2004/0176926 A1 | 9/2004 | Edie et al. |
| 2004/0193307 A1 | 9/2004 | Fujishima et al. |
| 2005/0097405 A1 | 5/2005 | Sesek et al. |
| 2005/0160847 A1 | 7/2005 | Walter |
| 2005/0218192 A1 | 10/2005 | Lovin et al. |
| 2005/0262236 A1 | 11/2005 | Schachtely et al. |
| 2007/0067678 A1 | 3/2007 | Hosek et al. |

* cited by examiner

DATA MANAGEMENT AND NETWORKING SYSTEM AND METHOD

BACKGROUND OF THE INVENTION

1. Field of the Invention

The present invention relates to a data networking system and a method for networking data, and in particular, a system and method for automatically managing machine tool data and providing the data to a remote terminal over a network.

2. Background Art

The ever-increasing emphasis on product quality continues to put pressure on manufacturers to find new ways to produce high quality products without increasing production time or otherwise increasing manufacturing costs. Inherent in this high quality, low cost dichotomy is a need to reduce scrap, while obtaining the longest possible life from manufacturing tools and equipment. Thus, increasing the number of tooling changes and/or decreasing the time between machine tool maintenance may increase product quality, but it may result in an unnecessary increase in tooling costs and/or lost production time.

Over time, manufacturers have developed systems and methods of predictive and preventative maintenance. Such systems may include a scheduled tool change based on a number of parts produced, or scheduled machine down time, during which bearings and other components may be replaced prior to their having an adverse effect on product quality. In order to implement these systems in a cost effective manner, or to reduce the frequency of these preventative maintenance tasks, decision-makers need information. In particular, information that is indicative of historical trends is useful, so that accurate predictions can be made regarding future production runs. In addition, the ability to isolate particular problem areas is also useful; this helps to concentrate efforts where they will have the most impact and produce the most benefit.

Toward this end, manufacturers have continued to analyze machine tools and their associated components in an effort to gather information they can use to make efficacious decisions regarding their production systems and processes. One type of machine tool analysis used is a vibration analysis. Information gathered from this type of analysis may be indicative of a variety of different production problems.

One system and method of characterizing a machining process using vibrational signatures of machines is described in U.S. Pat. No. 5,663,894, issued to Seth et al. on Sep. 2, 1997. Seth et al. describes characterizing the vibrational signatures of machines by discriminating vibrational activity at various positions on the machines. This is done both with and without machining loads. Both time and frequency domain analysis may then be stored in a database for future comparison and tracking.

In addition to gathering vibration data with and without machining loads, it may also be desirable to associate vibration data with particular operations performed on a machine. Once this data is gathered, it would then be desirable to collect it for storage on a network server that can be accessed by one or more terminals remotely located from the machining area. In general, traditional monitoring systems are based on individual tool condition analysis, and are used primarily for tool breakage. Templates are used, but trend analysis is not performed. Because data, such as vibration data, can occupy a large amount of storage space, and bandwidth when it is being transferred, it would also be desirable to reduce the size of the data, while still providing operation specific, and even tool specific, data that can be used to evaluate the machining operations.

SUMMARY OF THE INVENTION

One advantage of the present invention is that it provides a data networking system and method which allows machine operation data, at the tool specific level or beyond, to be examined remotely from the machining environment.

Another advantage of the present invention is that it provides a data networking system and method which reduces the size of the raw data to conserve data storage space and bandwidth, while still providing operation specific machine tool data to an end user.

The invention further provides a data management and networking system for automatically retrieving and storing data from a machine tool for distribution to a remote terminal over a network. The machine tool is operable to perform at least one machining operation on a workpiece, and has at least one sensor operatively connected to it for sensing a machine operation parameter. The at least one sensor has a first processing unit operatively connected to it for receiving data related to the machine operation parameter. The machine tool further has a controller operatively connected to it and configured to output data related to the at least one machining operation to the first processing unit. The system includes a data storage unit for storing data for subsequent retrieval. The system also includes a second processing unit configured to automatically collect the machine operation data and the machine operation parameter data from the first processing unit. The second processing unit is also configured to apply an algorithm to the machine operation parameter data to generate at least one parametric representation of the machine operation parameter data. The second processing unit is further configured to associate the at least one parametric representation with respective machining operation data, and to send the associated parametric representation and machining operation data to the data storage unit.

The invention also provides a data management and networking system for automatically retrieving and storing data from a machine tool for distribution to a remote terminal over a network. A machine tool is operable to perform at least one machining operation on a workpiece. The at least one machining operation includes machining time and non-machining time. The machine tool has at least one sensor operatively connected to it for sensing a machine operation parameter, and for outputting signals related to the machine operation parameter to a first processing unit. The machine tool also has a controller operatively connected to it and configured to output signals related to the at least one machining operation to the first processing unit. The system includes a data storage unit for storing data for subsequent retrieval. The system also includes a second processing unit configured to automatically collect the machining operation data and the machine operation parameter data from the first processing unit, and to separate out at least some data related to non-machining time. The second processing unit is further configured to apply an algorithm to the separated machine operation parameter data to generate at least one parametric representation of the separated machine operation parameter data, and to associate the machining operation data and the at least one parametric representation and to send the associated data to the data storage unit.

The invention further provides a method for managing and networking data for a machine tool. The method includes performing a machining operation on a first workpiece, the machining operation including machining time and non-machining time. A machine operation parameter is sensed while the machining operation is being performed. Data related to the sensed machine operation parameter is captured, and data related to the machining operation is also captured. At least some data related to non-machining time is separated out, and an algorithm is applied to the separated machine operation parameter data to generate at least one parametric representation of the separated machine operation parameter data. The at least one parametric representation is associated with respective machining operation data, and the associated parametric representation and machining operation data is stored for subsequent retrieval by a remote terminal over a network.

DETAILED DESCRIPTION OF THE PREFERRED EMBODIMENT

Figure 1:
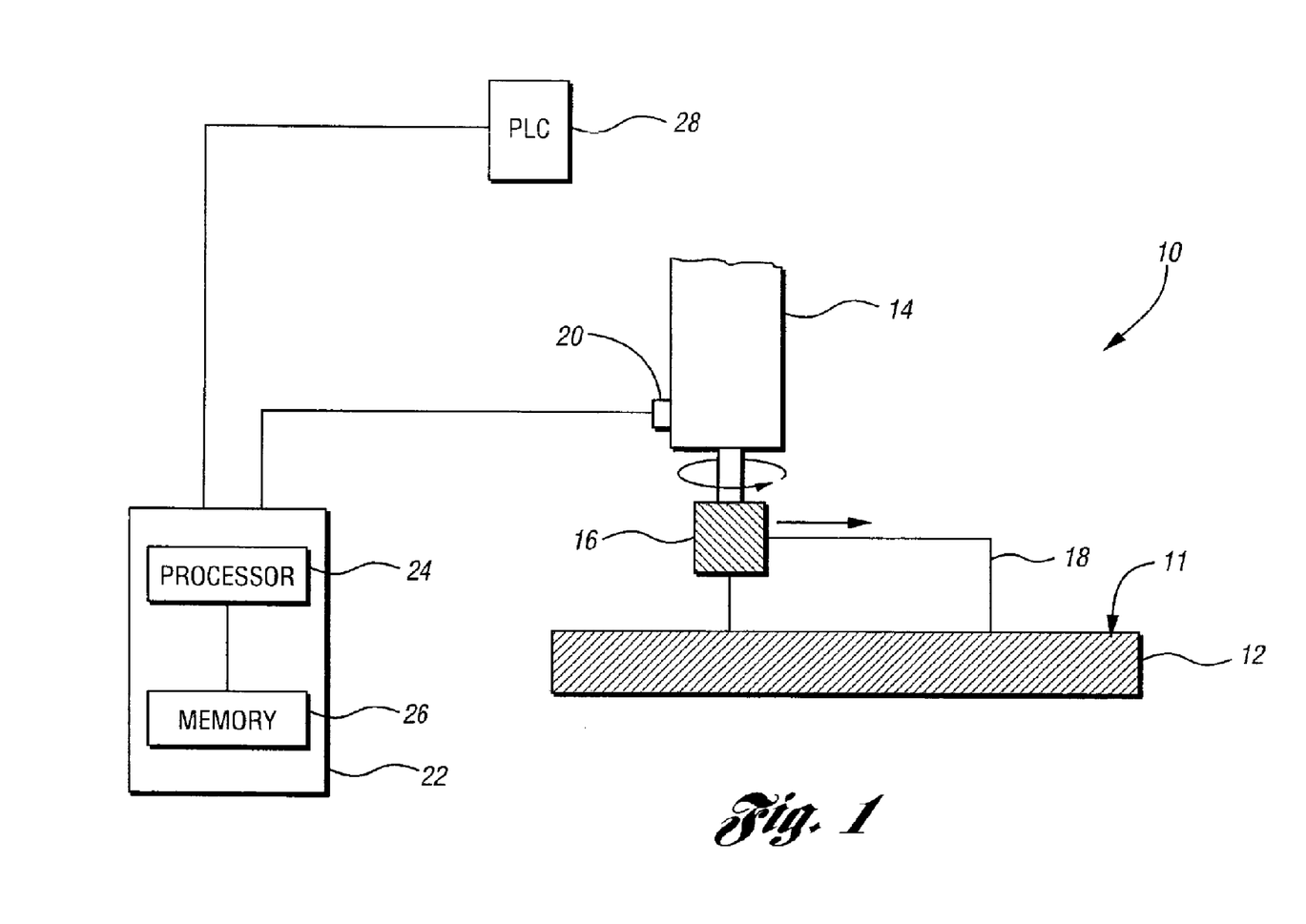
FIG. 1 is a schematic representation of a data management system for a machine tool.

Elements of a data management system 10 for a machine tool are illustrated in FIG. 1. One such data management system is described in U.S. Pat. No. 6,845,340, entitled "System and Method For Machining Data Management," issued on Jan. 18, 2005, and incorporated herein by reference. A portion of a machine tool 11 includes a bed 12 and a spindle 14. The machine tool 11, shown in FIG. 1, is a computer numerical control (CNC) milling machine. As will be readily discerned from the description below, the present invention can be used with any type of machine tool operable to perform at least one machining operation on a workpiece. Mounted in the spindle 14 is a cutting tool 16, which is used to machine a workpiece 18. Attached to the spindle 14 is a vibration sensor 20 that is configured to sense vibrations in the spindle 14 and output signals related to the vibrations to a first processing unit 22. The vibration sensor 20 may be chosen from any one of a number of types of vibration sensors, such as an accelerometer, a velocity sensor, or any other suitable sensor capable of sensing vibrations.

Of course, other types of sensors may be used—i.e., ones that sense machine operation parameters other than vibrations. For example, a current sensor may be used to measure changes in the amount of current the machine tool 11 draws during various machining operations. Similarly, a thermocouple, or other type of temperature sensor, could be used to detect changes in temperature of some portion of the machine tool 11. The spindle speed, torque, or feed rate could also be sensed to provide information relating to the machining operations. Indeed, any sensor capable of sensing a machine operation parameter can be used to send signals to the first processing unit 22.

The first processing unit 22 may be conveniently mounted directly on a portion of the machine tool 11, and includes a processor 24 and a memory 26. The processor 24 may be programmed to perform specific instruction sets on data, such as vibration data received from the sensor 20. A controller, such as a PLC 28, is also attached to the machine tool 11, and may be programmed with information specific to the machine tool 11, or specific to a machining process or cycle performed by the machine tool 11. The processor 24 and the memory 26 are both operatively connected to the sensor 20 and the PLC 28, such that data may be transferred among them.

As noted above, the PLC 28 may be programmed with information regarding particular machining operations. It is configured to output signals related to the machining processes to the first processing unit 22. For example, if a set of machining operations are being performed on the workpiece 12, and completion of this set of operations constitutes a machining cycle, the PLC 28 can, among other things, output signals to the first processing unit 22 delineating different portions of the machining cycle. Thus, the PLC 28 may send a tool pickup signal each time a different tool is used in a set of machining operations.

The PLC 28 may also send signals indicating when a particular cutting tool, such as the cutting tool 16, is performing a particular machining operation. In addition, the PLC 28 may communicate to the first processing unit 22 when the machine tool 11 is idling, and may further communicate time related data such as the number of machining cycles performed or the number of the workpiece being machined. Thus, by outputting signals related to the machining operations, the PLC 28 may communicate to the first processing unit 22 tool-specific data, idling data, and time related data, just to name a few. Of course, the specific information output from the PLC 28 to the processing unit 22 may vary, depending on the type and quantity of information desired.

Figure 2:
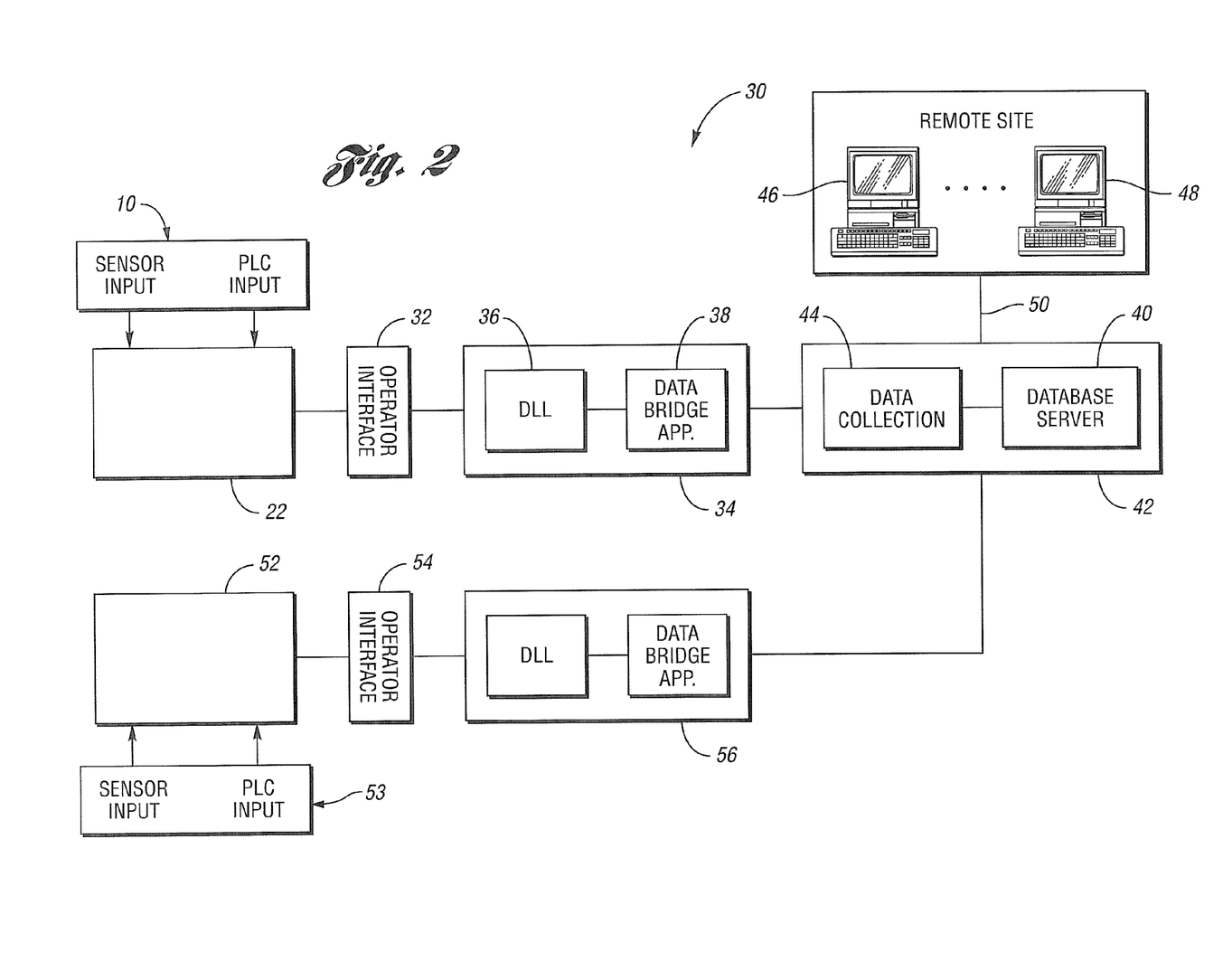
FIG. 2 is a schematic representation of a data management and networking system in accordance with the present invention.

FIG. 2 shows a data management and networking system 30 in accordance with the present invention. The system 30 includes an operator interface 32 operatively connected between the first processing unit 22 and a second processing unit, or machine PC 34. The machine PC 34 can be a personal computer attached to a machine tool, such as the machine tool 11, or it may be a specialized processing unit, particularly configured for use with the machine tool. The machine PC 34 has at least two software applications loaded onto it. The first, a dynamic link library (DLL) 36, is configured to automatically collect data from the first processing unit 22. The DLL 36 can be configured to automatically collect data from the first processing unit 22 at some predetermined interval, thereby eliminating the need for a manual download. For example, it may be desirable to have the DLL 36 collect data at a rate that is faster than the machining operation cycle time. After the DLL 36 collects the data, the data can be cleared from the memory 26 of the first processor 22, thereby freeing data storage space.

The DLL 36 may perform a number of functions on the data collected from the first processing unit 22. For example, the data collected from the first processing unit 22 may include machine operation parameter data, such as raw vibration data measured with the sensor 20 shown in FIG. 1. Because raw data, such as vibration data, can consume very large amounts of storage space, and bandwidth when the data is transferred over a network, it is desirable to reduce the size of the data being stored and transferred, without losing the information that will be useful to a production control decision maker.

The DLL 36 addresses this issue by generating at least one parametric representation of the machine operation parameter data, such as the raw vibration data. For example, the DLL 36 may include an algorithm which is applied to raw vibration data to generate one or more statistical parameters. Such parameters may include a maximum, a minimum, an average, an average root mean square (RMS), a maximum RMS, a minimum RMS, and an RMS summation. In addition, the DLL 36 may apply an algorithm to the preprocessed data that optimizes, for example, a kurtosis, a kurtosis average, a kurtosis maximum, a kurtosis minimum, and a kurtosis standard deviation. Like the RMS values, the kurtosis values are readily calculated using known statistical formulas.

The DLL 36 may also apply an algorithm to the raw vibration data that transforms the data into a frequency domain. By performing a frequency spectrum analysis, the raw vibration data can be analyzed by its frequency, such that a parametric representation of the raw vibration data can be in the form of frequency band amplitudes. That is, a frequency spectrum generated from the raw vibration data can be divided into frequency ranges, or bands, and the amplitude of these bands used as a parametric representation of the raw data. Similarly, the frequency spectrum data can be used to generate energy bands instead of frequency bands if it is desirable to represent the raw data in terms of its energy, rather than its frequency.

Figure 3A:
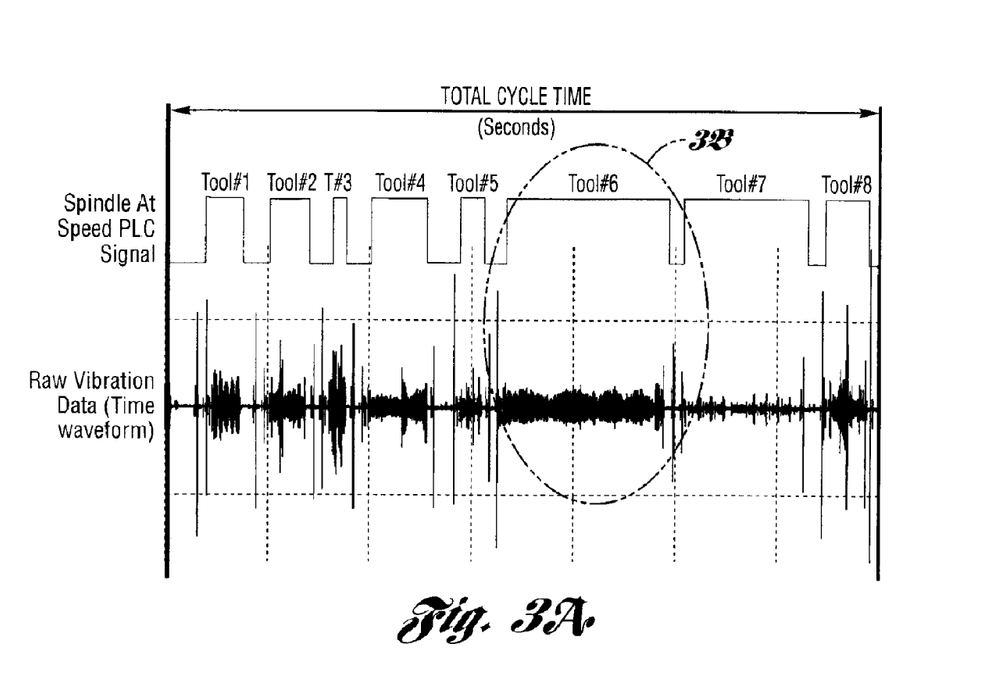
FIG. 3A shows raw vibration data collected from a machine tool for eight different cutting tools and associated cycle events.
Figure 3B:
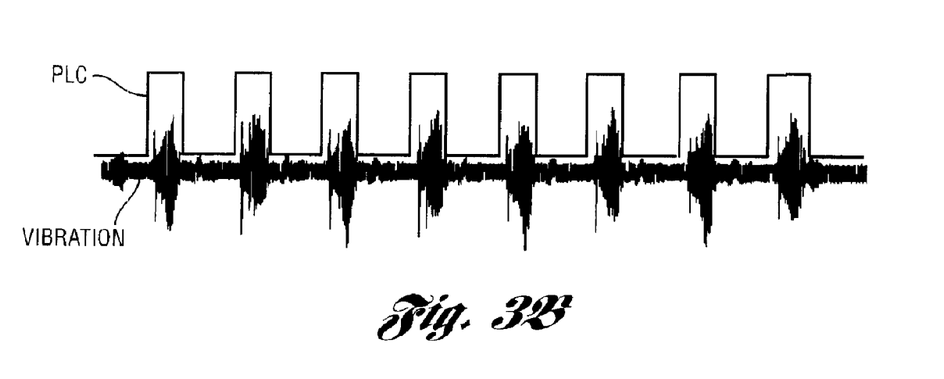
FIG. 3B shows additional detail of eight separate hits performed by tool 6 shown in FIG. 3A.

The DLL 36 communicates with a data bridge application 38, which is used to associate the parametric representation with respective machining operation data such that analysis of individual machining operations, and even individual tool operations, is possible. This process is explained more fully below in conjunction with FIG. 3. The data bridge application 38 also verifies that data related to the machining operation is valid. By generating the parametric representation of the machine operation parameter data, such as the raw vibration data, the size of the data that needs to be stored and transferred over a network is greatly reduced.

In addition to generating the parametric representation, the size of the data can be further reduced by separating out that portion of the machining operation that is non-machining time. During a given machining operation, there may be times when the workpiece is not actually being machined. For example, a spindle may move from one location on a workpiece to another location without cutting, or otherwise removing, any material from the workpiece. The machining operation may still be in process, even during the time when the workpiece is not being cut.

A machine tool, such as the machine tool 11, may also include automatic tool changing, such that a cutting tool is removed from a workpiece, the spindle is moved to a tool changing location, and the cutting tool is exchanged for another. All of this time constitutes non-machining time. In order to further reduce the size of the data stored and transferred over a network for the machine tool analysis, it may be desirable to separate some or all of this non-machining time. This function can be performed by the data bridge application 38. Of course, it may be desirable to retain at least some of the non-machining time to provide an indication of the operation of the machine tool and its components when it is not cutting a workpiece. Such information can be useful for preventative maintenance purposes. In such a case, the data related to the non-machining time can be sampled at a predetermined frequency such that the relevant data is available, but much of the non-machining time is not used, thereby conserving storage space and bandwidth.

Once the data bridge application 38 generates the statistical parameter or parameters, and selectively filters out redundant data, it associates the data with respective machining operation data and sends the associated data to a data storage unit, such as a database server 40 residing on a network server 42. The network server 42 also includes a data collection portion 44, which initially collects the data from the machine PC 34, and then provides it to the database server 40. The database server 40 stores the structured data received from the machine PC 34 so that it can be accessed by remote terminals 46, 48 linked to the server 42 by a network 50. It is understood that a hardwire connection between the network server 42 and the terminals 46, 48 is not required; rather, a network, such as the network 50, may be a wireless network. A network, such as the network 50, may also utilize, for example, telephone lines or fiber-optic cables to effect the connection between the terminals 46, 48 and the server 42.

In addition to the data collection described above, a second processing unit, such as the machine PC 34, can also be configured to automatically collect, from the first processing unit 22, data related to operation of the machine tool under predetermined conditions, wherein no work is performed on a workpiece. For example, a machine tool, such as the machine tool 11, can be programmed to move the spindle 14, pick up a tool, such as the tool 16, rotate the tool 16 at various predetermined speeds, and even idle, while the sensor 20 picks up the vibrations and sends the signals to the first processing unit 22. Where a spindle, such as a spindle 14, moves along slides (not shown) on the machine tool 11, the spindle 14 can be made to move to the extremities of each slide, which may be along axes at various orientations.

The data collected by the sensor 20, and sent to the first processing unit 22, can then be automatically collected by the machine PC 34 and sent to the network server 42. This data may provide important information regarding the health of the machine tool itself, the spindle, the bearings, and the slide. It may also provide information regarding the cross transmissivity between the various slides. This data provides information regarding how much vibration is transferred from one slide to another as the spindle is being moved. Thus, the present invention contemplates a database server, such as the database server 40, being provided with data related to machining operations, and data related to non-machining operations, of a machine tool.

Also shown in FIG. 2 is a third processing unit 52, which is configured similarly to the first processing unit 22. In particular, the third processing unit 52 receives inputs from a sensor and a PLC operatively connected to a second machine tool 53. An operator interface 54 provides a link between the third processing unit 52 and a fourth processing unit, or second machine PC 56. Data that is collected by the second machine PC 56 from the third processing unit 52 is sent to the network server 42. The network server is configured to associate the data from the two machine PC s 34, 56, which facilitates analysis of a specific machining operation that is performed on different machine tools. Thus, data from different workpieces that are machined on the same machine tool can be provided to the network server 42. In addition, data from the machining of different workpieces that are machined on different machine tools can also be provided to the network server 42. This data is then associated with related data, such that trends can be analyzed from the remote terminals 46, 48, and production control decisions can be made.

FIGS. 3A and 3B show a sample of machining operation data and machine operation parameter data that can be collected from a machine tool, such as the machine tool 11 shown in FIG. 1. The upper portion of FIG. 3A shows a signal provided by the PLC 28 that indicates machining operations performed by eight different tools. In addition, the waveform of the signal provided by the PLC 28 also shows when the machining operation is between tools. The lower portion of FIG. 3A shows raw vibration data in a time domain, correlated with the signals from the PLC 28. Thus, FIG. 3A provides an example of data that would be output from the sensor 20 and PLC 28 to the first processing unit 22.

As shown in FIG. 3B, an additional level of detail for the correlated PLC signals and vibration data is available. In particular, FIG. 3B shows vibration data and PLC signals for tool 6, which indicate eight separate machining steps, or "hits". Each of the eight hits indicates machining of some feature on a workpiece, such as the workpiece 18 shown in FIG. 1. Between each of eight hits is non-machining time, indicated by the valleys in the PLC signal and the areas of small amplitude on the vibration signal. Using this information, a machine PC, such as the machine PC 34, configured in accordance with the present invention, can automatically collect data related to a particular tool, or even particular hits within a tool, while separating out non-machining time, and calculating a statistical parameter that represents the raw vibration data without the unwieldy size associated with the raw data. By separating out at least some of the non-machining time data, the separated data can be represented by a single value, thereby significantly reducing the band width required for data transmission.

Figure 4:
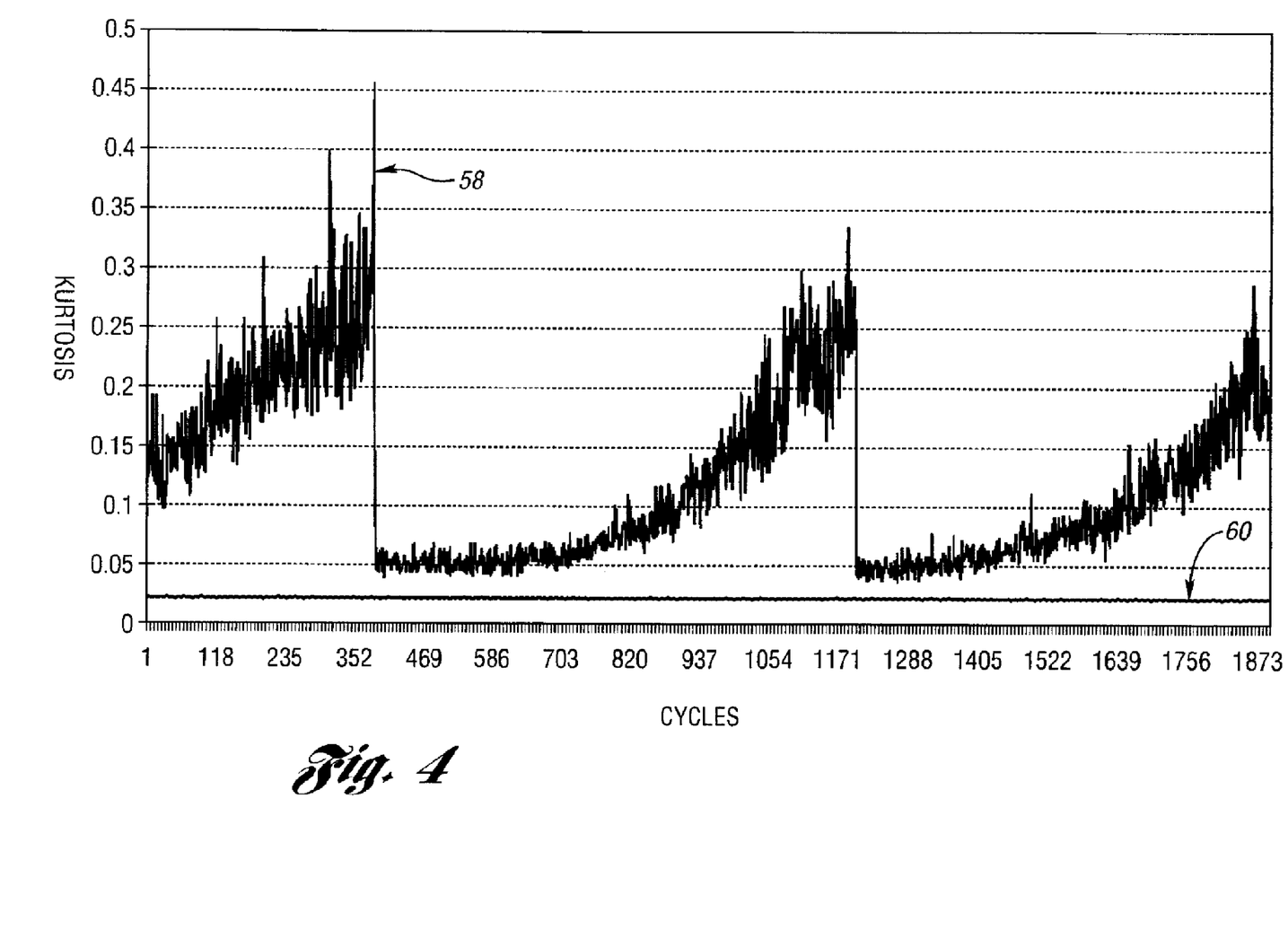
FIG. 4 shows a trend line analysis generated in accordance with the present invention.

FIG. 4 shows trend lines that may be generated using data from the database server 40 and accessed by the remote terminals 46, 48. In particular, the parametric representation of the raw vibration data is shown on the ordinate as a kurtosis value. The abscissa indicates the number of cycles, although the data may be also shown in a time domain or with an abscissa that indicates the number of parts machined. The upper trend line 58 represents data collected while a workpiece, such as the workpiece 18, was being machined. Conversely, the lower trend line 60 represents data collected when the machine tool was idling, and no machining was being performed.

This type of graphical data output can be helpful to a production control decision maker, particularly when it is combined with some predetermined maximum allowable value—i.e., predetermined alarm values. For example, in FIG. 4, the maximum value shown on the graph for the kurtosis of the vibration data is just over 0.45. A machine PC, such as the machine PC 34, can also collect alarm data from the first processing unit 22 and send it to the network server 42. Thus, an alarm value for the operation shown in FIG. 4 may be set at a value such as 0.45. The production control decision maker can than readily determine when the alarm value is exceeded, by examining a trend line, such as the trend line 58.

Figure 5A:
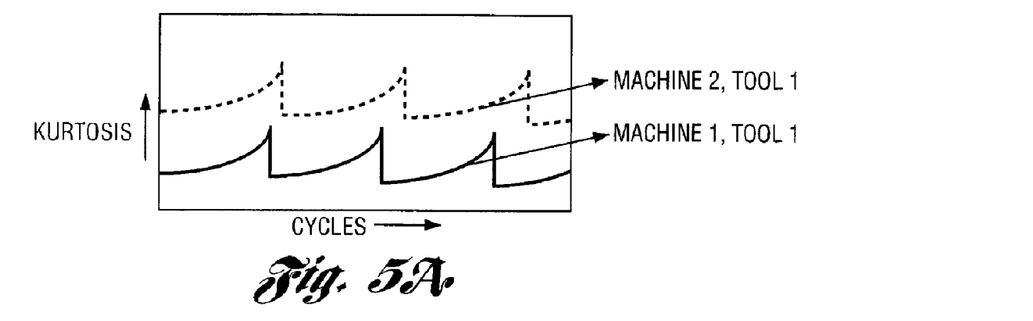
FIGS. 5A-5D show trend line analyses for various machine tools.
Figure 5B:
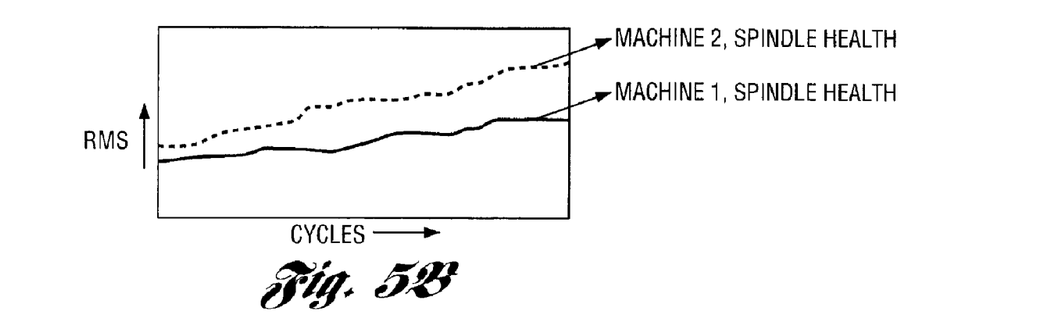
Figure 5C:
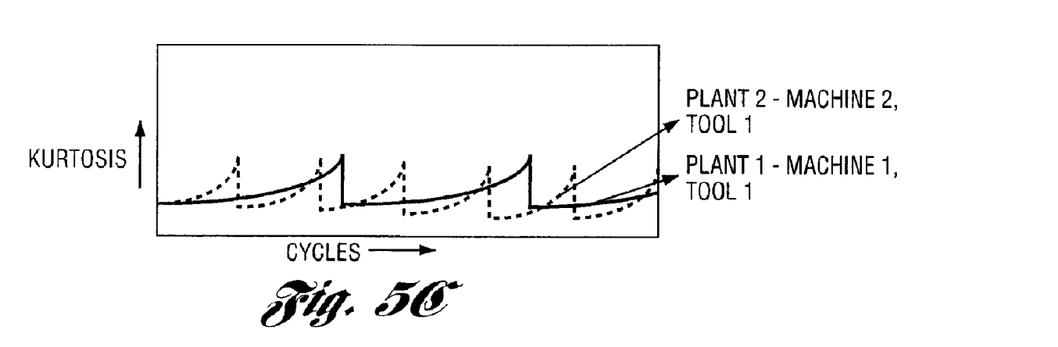
Figure 5D:
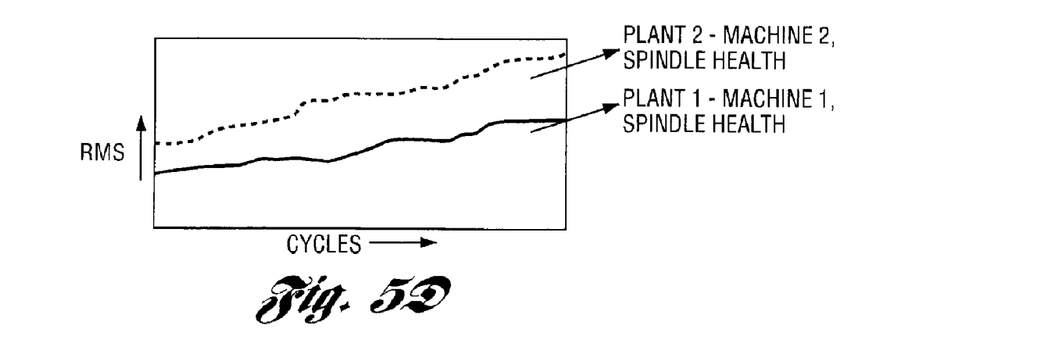

FIGS. 5A-5D illustrate trend lines generated for various machine tools. For example, FIG. 5A shows a comparison of two trend lines for the same tool (Tool 1) used on different machines within the same facility. This can provide a means for directly comparing the cutting performance of two machines at the same plant. FIG. 5B also compares two machines at the same facility, but the trend lines represent "spindle health"—i.e., the data shown here was collected during non-machining time. Finally, FIGS. 5C and 5D show comparisons of machine tools at different facilities.

To utilize a system, such as the system 30, the following steps may be employed. A machining operation is performed on a first workpiece, and vibration data is sensed by a vibration sensor and captured by a first processing unit. Data related to the machining operation is also captured by the first processing unit, upon receiving signals from a PLC. At least some data related to non-machining time is separated out, and at least one parametric representation of the separated data is generated. The generated parametric representation is then associated with respective machining operation data, so that information specific to a particular tool, or even a particular hit within a tool, is available on a network server. This process can be repeated for additional workpieces, on the same machine, on different machines within the same facility, or even on different machines in different facilities.

Because the present invention manages the raw machining data to employ the use of parametric representations and the separation of non-machining time, information that would otherwise be inaccessible because of storage and communication problems, is now available over a network system so that many machine tools, within a single plant, or even different plants, can be examined together to provide an overall picture of a machining process. Further, given the level of detail that can be achieved, individual steps within a particular tool can also be examined across many different machines at many different facilities.

While the best mode for carrying out the invention has been described in detail, those familiar with the art to which this invention relates will recognize various alternative designs and embodiments for practicing the invention as defined by the following claims.

What is claimed is:

1. A data management and networking system for automatically retrieving and storing data from a machine tool for distribution to a remote terminal over a network, the machine tool being operable to perform at least one machining operation on a workpiece and having at least one sensor operatively connected thereto for sensing a machine operation parameter, the at least one sensor having a first processing unit operatively connected thereto for receiving machine operation parameter data related to the machine operation parameter, the machine tool further having a controller operatively connected thereto and configured to output machining operation data related to the at least one machining operation to the first processing unit, the system comprising:
a data storage unit for storing data for subsequent retrieval; and
a second processing unit configured to automatically collect the machining operation data and the machine operation parameter data from the first processing unit and to apply an algorithm to the machine operation parameter data to generate at least one parametric representation of the machine operation parameter data, the second processing unit being further configured to:
associate the at least one parametric representation with respective machining operation data and to send the associated parametric representation and machining operation data to the data storage unit, and
automatically collect alarm data from the first processing unit and associate the alarm data with the at least one parametric representation and respective machining operation data such that the associated parametric representation and machining operation data sent to the data storage unit includes the alarm data.

2. The system of claim 1, wherein the at least one parametric representation includes at least one of a maximum, a minimum, an average, an average root mean square, a maximum root mean square, a minimum root mean square, a root mean square summation, a kurtosis, a kurtosis average, a kurtosis maximum, a kurtosis minimum, a kurtosis standard deviation, energy band values, and frequency band amplitudes.

3. The system of claim 1, the at least one machining operation including machining time and non-machining time, wherein the second processing unit is further configured to separate out at least some data related to non-machining time before the associated parametric representation and machining operation data is sent to the data storage unit, thereby reducing the amount of data sent to the data storage unit.

4. The system of claim 3, wherein the data related to non-machining time is sampled at a predetermined frequency and the sample is sent to the data storage unit, thereby providing data related to operation of the machine tool when the workpiece is not being machined.

5. The system of claim 1, wherein the data related to the machine operation parameter is at least one of machine tool vibrations, machine tool current draw, machine tool temperature, machine tool torque, machine tool speed, and machine tool feed.

6. The system of claim 1, wherein the second processing unit is further configured to automatically collect, from the first processing unit, data related to operation of the machine tool under predetermined conditions, the predetermined conditions including the machine tool selecting a cutting tool and operating at a predetermined speed without work being performed on a workpiece, thereby providing information related to the machine tool independent of workpiece machining.

7. The system of claim 1, wherein the second processing unit includes a data bridge application configured to verity the validity of the machining operation data collected by the second processing unit.

8. The system of claim 1, wherein the data storage unit resides in a network server, the system further comprising a terminal linked to the server by a network, the terminal being configured for remote retrieval of the associated parametric representation and machining operation data.

9. The system of claim 8, a second machine tool being operable to perform at least one machining operation on a workpiece and having at least one sensor operatively connected thereto for sensing a machine operation parameter, the at least one sensor on the second machine tool having a third processing unit operatively connected thereto for receiving data related to the machine operation parameter of the second machine tool, the second machine tool further having a controller operatively connected thereto and configured to output data related to the at least one machining operation of the second machine tool to the third processing unit, the system further comprising:
a fourth processing unit configured to automatically collect the machining operation data and the machine operation parameter data from the third processing unit and to apply an algorithm to the collected data to generate at least one parametric representation of the machine operation parameter data of the second machine tool, the fourth processing unit being further configured to associate the at least one parametric representation of the machine operation parameter data of the second machine tool with respective machining operation data of the second machine tool and to send the associated data of the second machine tool to the data storage unit, and
wherein the network server is configured to associate the data sent from the second processing unit with respective data sent from the fourth processing unit, thereby facilitating analysis of a specific machining operation performed on different machine tools.

10. A data management and networking system for automatically retrieving and storing data from a machine tool for distribution to a remote terminal over a network, the machine tool being operable to perform at least one machining operation on a workpiece, the at least one machining operation including machining time and non-machining time, the machine tool having at least one sensor operatively connected thereto for sensing a machine operation parameter and for outputting signals related to the machine operation parameter to a first processing unit, the signals related to the machine operation parameter providing the first processing unit with machine operation parameter data, the machine tool further having a controller operatively connected thereto and configured to output signals related to the at least one machining operation to the first processing unit, the signals related to the at least one machining operation providing the first processing unit with machining operation data the system comprising:
a data storage unit for storing data for subsequent retrieval; and
a second processing unit configured to automatically collect the machining operation data and the machine operation parameter data from the first processing unit at a predetermined frequency greater than a cycle time for the at least one machining operation, and to separate out at least some data related to non-machining time, thereby leaving remaining machine operation parameter data, the second processing unit being further configured to apply an algorithm to the remaining machine operation parameter data to generate at least one parametric representation of the remaining machine operation parameter data, and to associate the machining operation data and the at least one parametric representation and to send the associated parametric representation and machining operation data to the data storage unit.

11. The system of claim 10, wherein the data related to non-machining time is sampled at a predetermined frequency and the sample is sent to the data storage unit, thereby providing data related to operation of the machine tool when the workpiece is not being machined.

12. The system of claim 10, wherein the at least one parametric representation includes at least one of a maximum, a minimum, an average, an average root mean square, a maximum root mean square, a minimum root mean square, a root mean square summation, a kurtosis, a kurtosis average, a kurtosis maximum, a kurtosis minimum, a kurtosis standard deviation, energy band values, and frequency band amplitudes.

13. The system of claim 10, wherein the data related to the machine operation parameter is at least one of machine tool vibrations, machine tool current draw, machine tool temperature, machine tool torque, machine tool speed, and machine tool feed.

14. The system of claim 10, wherein the data storage unit resides in a network server, the system further comprising a terminal linked to the server by a network, the terminal being configured for remote retrieval of the associated parametric representation and machining operation data.

15. The system of claim 14, a second machine tool being operable to perform at least one machining operation on a workpiece and having at least one sensor operatively connected thereto for sensing a machine operation parameter and for outputting signals related to the machine operation parameter to a third processing unit, the second machine tool further having a controller operatively connected thereto and configured to output signals related to the at least one machining operation of the second machine tool to the third processing unit, the system further comprising:
a fourth processing unit configured to automatically collect the machining operation data and the machine operation parameter data from the third processing unit and to apply an algorithm to the collected data to generate at least one parametric representation of the machine operation parameter data of the second machine tool, the fourth processing unit being further configured to associate the at least one parametric representation of the machine operation parameter data of the second machine tool with respective machining operation data of the second machine tool and to send the associated data of the second machine tool to the data storage unit, and wherein the network server is configured to associate the data sent from the second processing unit with respective data sent from the fourth processing unit, thereby facilitating analysis of a specific machining operation performed on different machine tools.

16. A method for managing and networking data for a machine tool, comprising:

performing a machining operation on a first workpiece and on a second workpiece, the machining operations on the first and second workpieces each including machining time and non-machining time;

sensing a machine operation parameter while the machining operations are being performed on the first and second workpieces;

capturing machine operation parameter data related to the sensed machine operation parameter for the machining operations performed on the first and second workpieces;

capturing machining operation data related to the machining operations performed on the first and second workpieces;

separating out at least some data related to the non-machining time from the captured machine operation parameter data for the machining operations performed on each of the first and second workpieces, thereby leaving remaining machine operation parameter data for each of the first and second workpieces;

applying an algorithm to the remaining machine operation parameter data for each of the first and second workpieces to generate at least one parametric representation of the remaining machine operation parameter data for each of the first and second workpieces;

associating the at least one parametric representation for each of the first and second workpieces with respective machining operation data; and storing the associated parametric representation and machining operation data for each of the first and second workpieces for subsequent retrieval by a remote terminal over a network, thereby facilitating analysis of the machining operation performed on two workpieces.

17. The method of claim 16, wherein the first and second workpieces are machined on the same machine tool.

18. The method of claim 16, wherein the first and second workpieces are machined on different machine tools.

* * * * *